United States Patent [19]
Guigan et al.

[11] Patent Number: 4,921,128
[45] Date of Patent: May 1, 1990

[54] LINEAR MAGAZINE FOR STORING AND AUTOMATICALLY DISPENSING OBJECTS

[76] Inventors: Jean Guigan, 9, rue Jean Mermoz, 75008 Paris, France; Franck Guigan, 100, rue Saint Dominique, 75007 Paris, France

[21] Appl. No.: 261,291

[22] Filed: Oct. 24, 1988

[30] Foreign Application Priority Data

Oct. 30, 1987 [FR] France .................................. 87 15078

[51] Int. Cl.⁵ ...................... B65G 59/06; B65G 47/00
[52] U.S. Cl. ........................................ 221/75; 221/86; 221/129; 221/153; 221/253; 414/797.9; 198/550.12
[58] Field of Search ........................ 221/75, 81, 84, 86, 221/124, 129, 131, 151, 152, 153, 195, 224, 236, 237, 238, 253; 414/797.9, 797.6, 795.8; 198/550.12; 474/87, 211

[56] References Cited

U.S. PATENT DOCUMENTS

| | | | |
|---|---|---|---|
| 1,886,378 | 11/1932 | Dearsley | 221/236 |
| 2,586,268 | 2/1952 | Smith | 474/211 |
| 2,616,573 | 11/1952 | Grady | 221/236 X |
| 3,127,006 | 3/1964 | Tochtermann et al. | 474/211 X |
| 3,426,605 | 2/1969 | Cowlin | 474/87 |
| 3,734,345 | 5/1973 | Garner | 221/81 |
| 3,819,088 | 6/1974 | Guigan | 221/224 |
| 4,000,821 | 1/1977 | Naito et al. | 221/253 |
| 4,151,930 | 5/1979 | Baker et al. | 221/129 |
| 4,519,523 | 5/1985 | Ohba et al. | 221/253 X |
| 4,609,365 | 9/1986 | Eberle | 474/211 X |

FOREIGN PATENT DOCUMENTS

| | | |
|---|---|---|
| 2226769 | 2/1973 | Fed. Rep. of Germany . |
| 3048585 | 7/1982 | Fed. Rep. of Germany ...... 221/129 |

Primary Examiner—Joseph J. Rolla
Assistant Examiner—Edward S. Ammeen
Attorney, Agent, or Firm—Sughrue, Mion, Zinn, Macpeak & Seas

[57] ABSTRACT

A linear magazine for storing and automatically dispensing objects (10) disposed in stacks or in lines within juxtaposed bins (1) includes an extractor cartridge (20) associated with each bin and co-operating with a cog belt (50) which is common to all of the bins. The invention is applicable to dispensing cassettes, books, cigarettes, spare parts, etc.

7 Claims, 7 Drawing Sheets

LINEAR MAGAZINE FOR STORING AND AUTOMATICALLY DISPENSING OBJECTS

The present invention relates to a linear magazine for storing and automatically dispensing objects and is applicable to goods which are preferably packaged in rectangular boxes.

BACKGROUND OF THE INVENTION

U.S. Pat. No. 3,819,088 describes a linear storage magazine comprising at least one module including a plurality of vertical drawers disposed side-by-side and divided into vertical compartments each containing a stack of same-type boxes. Each drawer is movable in horizontal translation out from the module, thus bringing a given vertical compartment out from the module.

The two side walls of the drawer in each compartment have two facing openings in order to pass the box situated at the bottom of the stack; these openings communicate with a slot made in the bottom of the drawer parallel to the direction of a conveyor which is common to all of the compartments of the module and which carries an ejector.

A box is extracted by combining two orthogonal movements: the drawer moves out from the module and the ejector passes beneath the drawer and along the slot of the selected compartment.

Such a device gives entire satisfaction for storing and dispensing small items weighing only a few grams, e.g. pharmaceutical goods.

Implementing such drawers with a plurality of compartments is difficult when storing and dispensing boxes which are larger in size since the magazine represents a large financial cost and is not capable of dispensing at a high enough rate to meet certain requirements such as for selling pharmaceutical goods wholesale. The present invention seeks to provide a magazine which is capable of satisfying such requirements.

SUMMARY OF THE INVENTION

The present invention provides a magazine for storing and automatically dispensing objects in boxes, the magazine comprising at least one plurality of juxtaposed bins constituting a linear struccture which is generally rectangular in shape. Each bin is intended to store either a stack of boxes, or else a line of blister packs or the like, and has an evacuation opening in a front face of said linear structure suitable for passing out a single box. Each bin includes an ejector cartridge in its bottom or its top, said cartridge serving to eject one box at a time from the bin, said cartridge comprising firstly a chain of links including at least one means suitable for ejecting said box through said evacuation opening when said chain is set in motion, and secondly extraction control means for meshing said chain with a cog belt situated parallel to the front face of said linear structure level with the ejector cartridges and associated with means for being constantly driven in translation motion, a conveyor being provided parallel to said structure for taking said ejected box away. The assembly as a whole is controlled by a programmed computer.

The present invention also provides a linear magazine for storing and automatically dispensing objects in boxes, the magazine comprising a plurality of juxtaposed bins each containing a pile of boxes and each having two side faces, a front face provided with an opening for passing out the box situated at the bottom of the stack, a rear face, and a bottom with a slot running between the front face and rear face, in which each bin is provided beneath its bottom with an ejector cartridge which comprises a chain having links sliding around a closed guide having two rectilinear portions, one of which is offset downwardly, said linear portions being interconnected by two semi-circular portions, with each link having a meshing tooth on its outer side face except for two diametrically opposite links which are provided with respective ejector pegs suitable for passing along said slot, with extraction control means being provided near said rear face for causing a peg-carrying link to advance by one notch; said magazine also includes a cog belt associated with means suitable for continuously driving it in translation motion, said belt being in front of said front face in level with said ejection cartridge in order to drive said link chain on command; an evacuation conveyor is provided parallel to said cog belt.

In an equivalent embodiment, the two links which do not include a meshing tooth do not include an ejector peg either but are to be found in the proximity of two links which carry about a meshing tooth and an ejector peg.

In a variant embodiment, said ejector cartridge includes two diametrically opposite links which are not fitted with respective ejector pegs as above, but which differ from the other links by the fact that their respective side meshing teeth are cut short or truncated, e.g. downwardly. In addition, the cartridge is mounted on a shaft parallel to said linear structure and is made movable between two positions by virtue of a controllable electromagnet, one of said positions being an inclined position in which a link having a truncated tooth cannot co-operate with the cog belt, and the other being a horizontal or working position in which meshing may take place.

The present invention also provides a linear magazine for storing and automatically dispensing objects enclosed in blister packs or the like, the magazine comprising a plurality of juxtaposed bins constituting a generally rectangular linear structure with each bin including a shaft on which blister packs are threaded, and an opening in its front face for passing out one blister pack at a time. An ejector cartridge is provided in the ceiling of each bin; this cartridge has links with side meshing teeth as mentioned above and it has a plurality of links without side meshing teeth but each carrying a peg which is interposed between adjacent blisters. The cartridge includes extraction control means at the rear face of the bin for causing a peg-carrying link to advance by one notch so that the other links mesh with a cog belt parallel to the front face of said linear structure and situated facing said cartridges and associated with means for being constantly driven in translation.

In an advantageous embodiment, said drive means of the evacuation conveyor of a magazine is suitable for being coupled to the evacuation conveyor of an analogous magazine which is juxtaposed.

Said cog belt is preferably made of a substance which is flexible enough for each of its teeth to be capable of being crushed under pressure from a meshing tooth.

Said links preferably co-operate with one another by means of a ball-and-socket assembly and they are made of a plastic substance which slides well and is hard-wearing, e.g. nylon.

BRIEF DESCRIPTION OF THE DRAWINGS

Embodiments of the invention are described by way of example with reference to the accompanying drawings, in which.

MORE DETAILED DESCRIPTION

Figure 1:
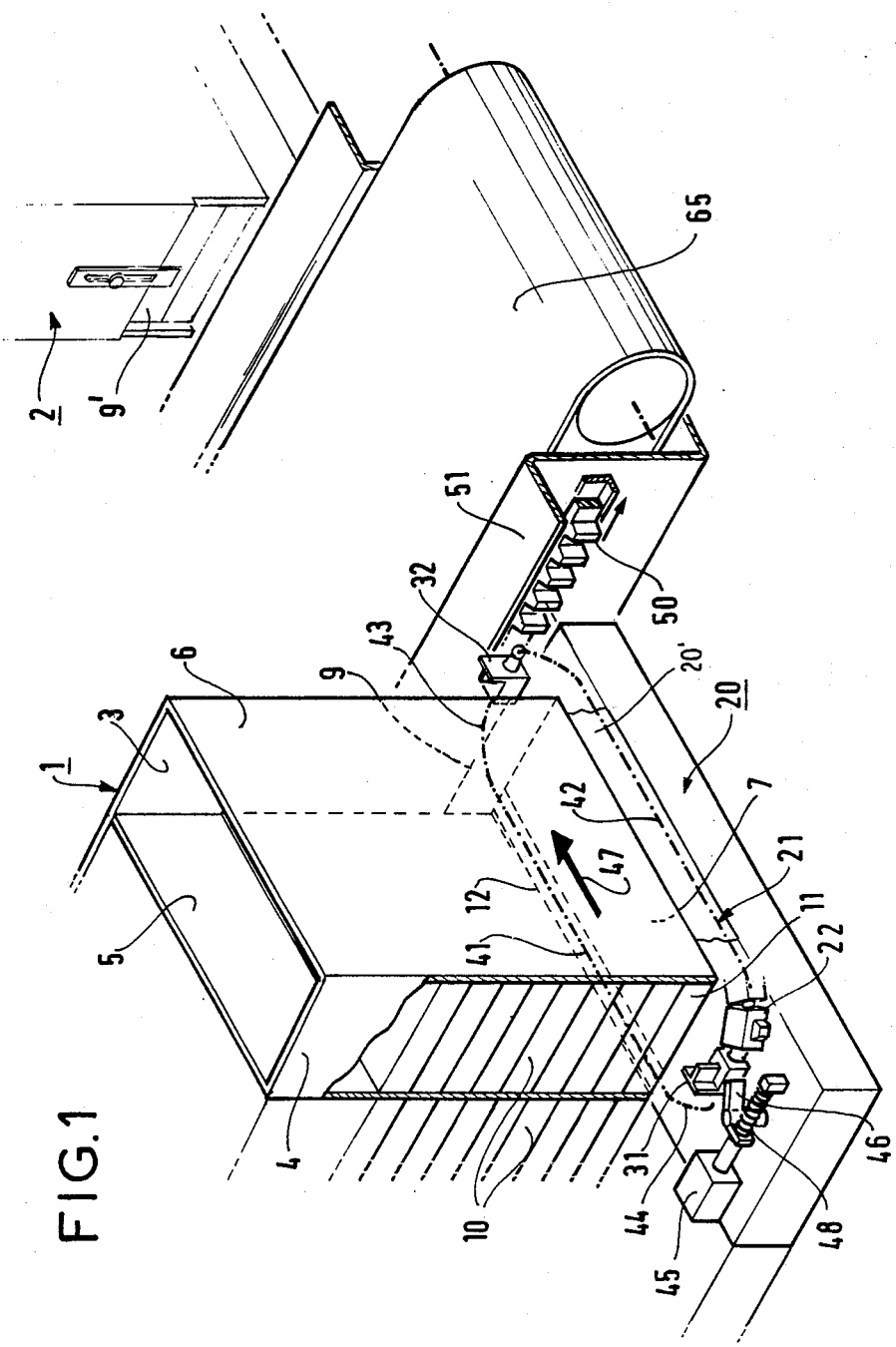
FIG. 1 is a highly diagrammatic perspective view of a magazine in accordance with the invention.

FIG. 1 is a perspective view of a magazine with only two of its bins 1 and 2 being illustrated. Bin 1 is generally rectangular in shape and is constituted by sheet steel guides having a front face 3, a rear face 4, two side walls 5 and 6, and a bottom 7. This bin contains a stack 10 of rectangular boxes. Just above the bottom 7, the front wall 3 is provided with an opening 9 for passing out the bottom box 11 in the stack 10. A slot 12 parallel to the walls 1 and 2 is provided in the bottom 7 between the faces 3 and 4.

Figure 5:
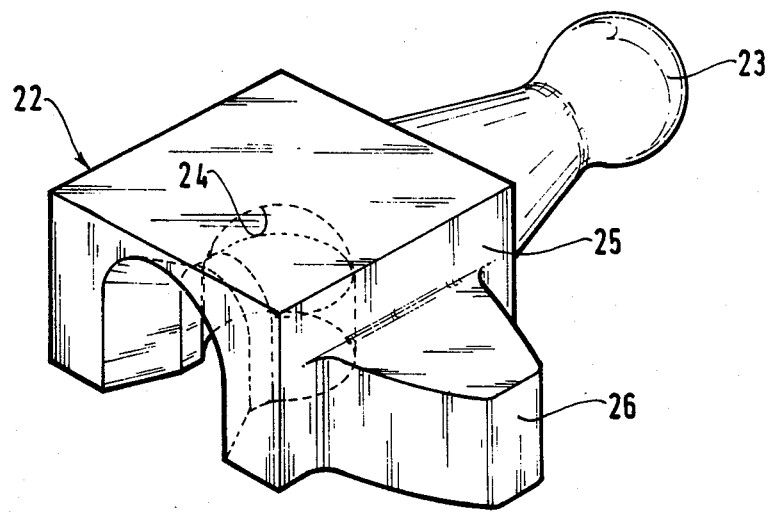
FIG. 5 is a diagrammatic perspective view of a link in the chain of the ejector cartridge.
Figure 6:
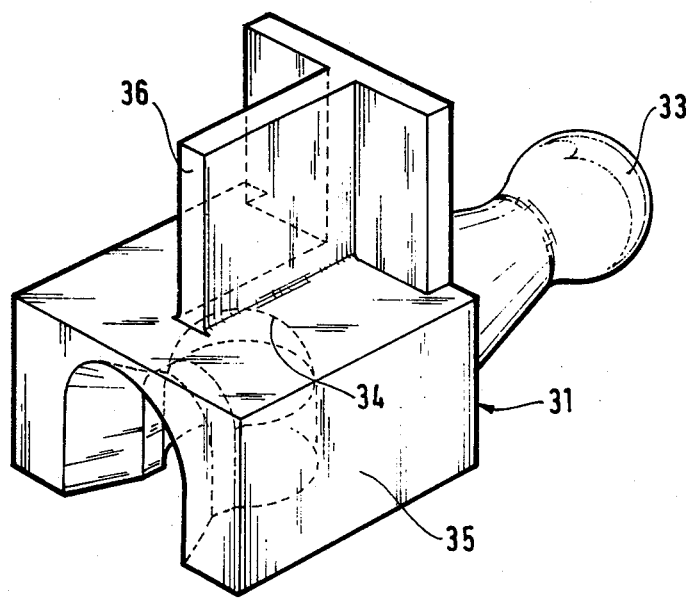
FIG. 6 is a diagrammatic perspective view of a peg link having no meshing tooth and belonging to the chain of the ejector cartridge.

Each of the bins 1 and 2 is provided with an ejector cartridge 20 beneath its bottom. The cartridge comprises a chain 21 whose parts appear more clearly in FIGS. 5 and 6.

The chain 21 is essentially constituted by links 22 (see FIG. 5); with each link 22 being preferably made of a plastic substance which slides well and is hard-wearing, such as nylon for example. It co-operates with adjacent links 22 by ball and socket 23–24 type interfitting. It includes a drive tooth 26 on its outer side face 25.

The chain 21 also includes two ejector links 31 and 32 which are identical to each other but different from the links 22. In the rest position, these links are situated so as to be diametrically opposite each other (see FIG. 1). The link 31 shown in FIG. 6 co-operates with two adjacent links by the same ball and socket 33–34 type system, but its outer side wall 35 is smooth while its top wall carries an ejector peg 36.

The chain in FIG. 1 slides inside a closed guide 20'. It has two rectilinear portions 41 and 42, with the portion 42 being lower than the portion 41 such that an ejector peg is retracted beneath the bottom 7. The rectilinear portions 41 and 42 are interconnected by two substantially semi-circular portions 43 and 44.

The ejector cartridge 20 finally includes means 45, 46 for displacing the ejector link 31 by one notch in the direction of arrow 47 for a purpose explained below. These means are constituted by an electromagnet 45 acting on an arm 46 which is associated with a spring 48.

The magazine in accordance with the invention also includes a cog belt 50 which is maintained in a housing 51 situated in front of the face 3 and level with the teeth 26 of the links 22 of the chain 21. This cog belt is made using technology similar to that implemented in the car industry for manufacturing the cog belts used for driving alternators. It is preferably made of a flexible synthetic material which is reinforced with a cloth having a high degree of strength in traction.

Figure 2:
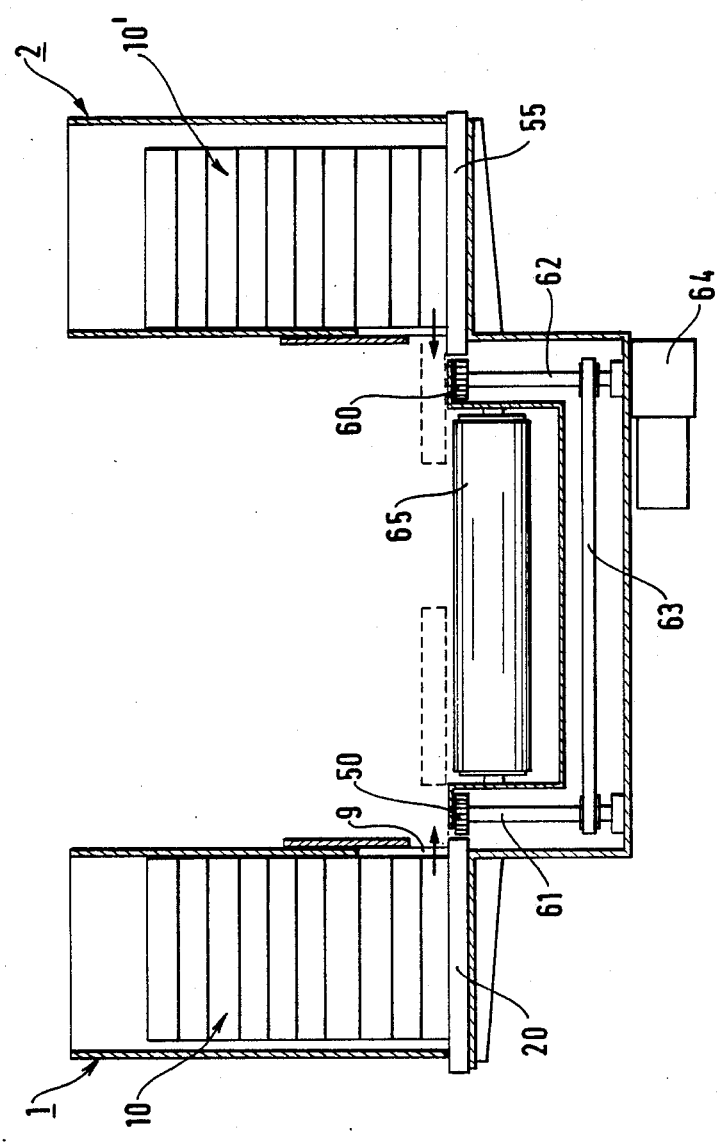
FIG. 2 is a side elevation of the FIG. 1 magazine showing two bins in accordance with the invention in highly diagrammatic form.
Figure 3:
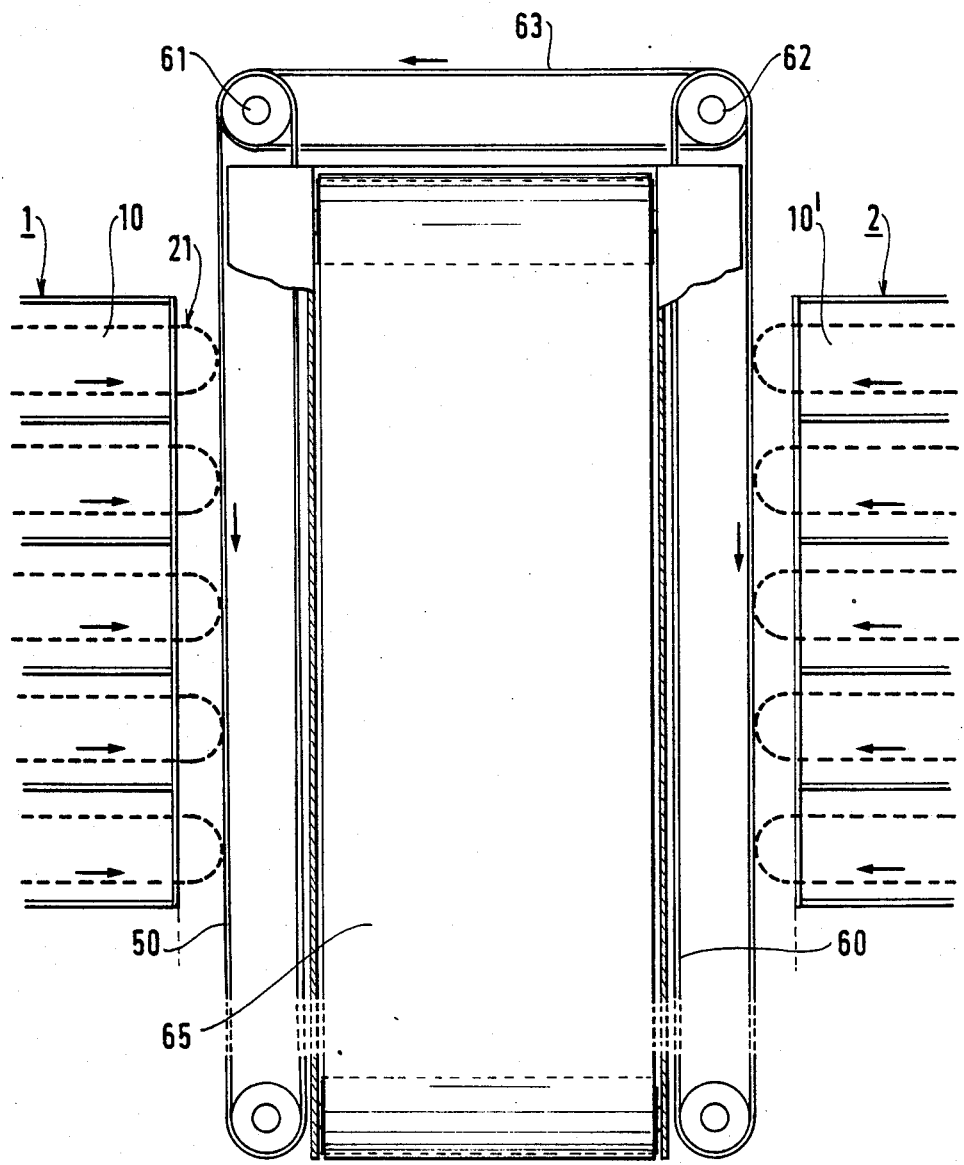
FIG. 3 is a plan view showing the relative dispositions of the cog belt and of the chains which it may drive.

FIG. 2 shows the bins 1 and 2 with their stacks of boxes 10 and 10', their ejector cartridges 20 and 55 associated with cog belts 50 and 60 which are driven by shafts 61 and 62 interconnected by a transmission belt 63, with the entire assembly being driven by a motor 24. This disposition appears diagrammatically in FIG. 3 and it is clear that a single motor 64 can continuously drive a cog belt suitable for co-operating with all of the bins. An evacuation conveyor 65 is provided parallel to the drive belts 50 and 60.

A magazine of the invention operates as follows: when in the rest position as shown in FIG. 1, the two ejector links 31 and 32 are in diametrically opposite positions and the link 32 which does not have a side tooth cannot be driven by the cog belt 50 which is itself continuously driven. On receiving an eject instruction to extract the box 11, the electromagnet 45 is actuated and its arm 46 pushes the ejector link 31 through a distance of one notch in the direction of arrow 47. The link 32 thus also moves through one notch and the links 22 can now be driven by the cog belt 50. The ejector link 31 passes through a slot 12 and pushes the box 11 until it passes out through the slot 9 and lands on the evacuation conveyor 65. The link 31 is then in the position initially occupied by the link 32, and drives to the chain 21 is automatically stopped. By virtue of the zone 22 of the chain guide being offset downwardly, the link 32 is retracted while the link 31 is operating.

The belt 50 must be flexible enough for each of its teeth to be capable of being crushed under pressure from a meshing tooth 26 on a link 22 on each occasion of the frequent occurrence of the tooth 26 crashing into the belt 50 rather than meshing smoothly therewith.

In another embodiment, the teeth of the belt 50 are not that flexible themselves. However, flexible foam is provided between the belt 50 and its housing 51 for compensating the stiffness of the belt in the event of the drive teeth 26 crashing into it, as described above.

Operation would be equivalent if the two ejector links 31 and 32 each had its own side tooth while two of the links 22 situated close to said ejector links did not have a side tooth. However three different types of link would then be required.

Figure 4:
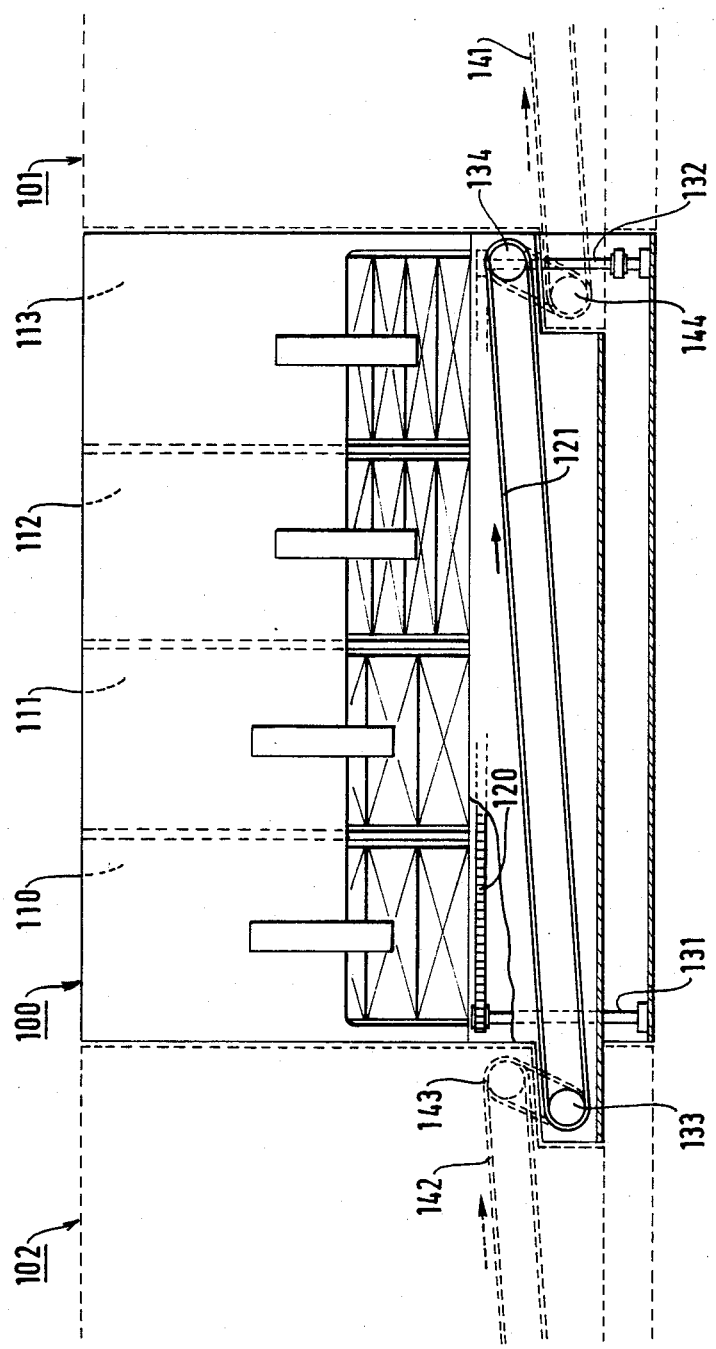
FIG. 4 is a fragmentary diagrammatic elevation view of a module comprising a plurality of bins and a common evacuation conveyor therefor.

In the variant embodiment shown in FIG. 4, there is a magazine 100 in accordance with the invention comprising juxtaposed bins 110, 111, 112, and 113, together with their common cog belt 120 driven by shafts 131 and 132, and a common evacuation conveyor 121 driven at shafts 133 and 134.

Magazines 101 and 102 analogous to the magazine 100 may be juxtaposed with their evacuation conveyors 141 and 142 being coupled to the magazine 100 at shafts 143 and 144 which are coupled with shafts 133 and 134, respectively. It is therefore possible to put an arbitrary number of magazines in accordance with the invention into operation with each magazine having an arbitrary number of bins and with the bins containing boxes in a wide variety of sizes.

The entire assembly is controlled by a controlling computer.

By way of practical example, the various component parts of the device may have the following dimensions, given in centimeters:

|  | Height | Length | Width |
|---|---|---|---|
| Magazine | 180 | 600 | 80 |
| Bin | 120 | 20 | 10 |
| Chain (total length) |  | 60 |  |
| Ejection conveyor |  | 600 | 30 |
| Links |  | 0.6 to 2 |  |

This gives two rows of 60 bins each, i.e. a total of 120 bins.

If the cog belt 50 is driven at a speed of 750 cm per minute, the maximum number of ejections per bin is 37.5 per minute, giving 4,500 ejections per minute for the entire magazine.

The goods concerned may be constituted by: audio or video cassettes, compact disks, books, magazines and periodicals, cigarettes packs, medicines, electronic components, spare parts, food products, clothing, clothing accessories, watches, shoes, cosmetics, suitcases, etc.

Goods weighing up to 20 kg can be ejected, which value also corresponds to the upper limit for operating the conveyor belts.

Figure 7:
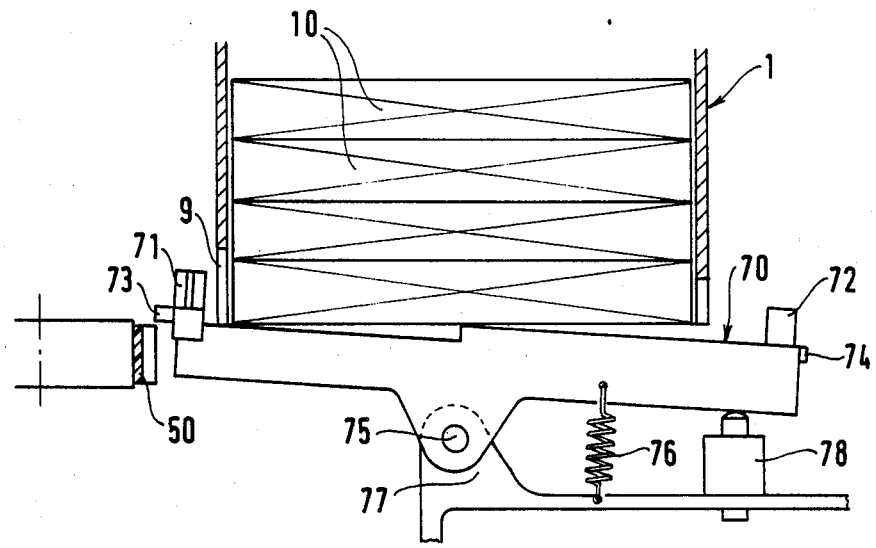
FIG. 7 is a diagrammatic side view of a variant ejector cartridge in accordance with the invention shown in its rest position.
Figure 8:
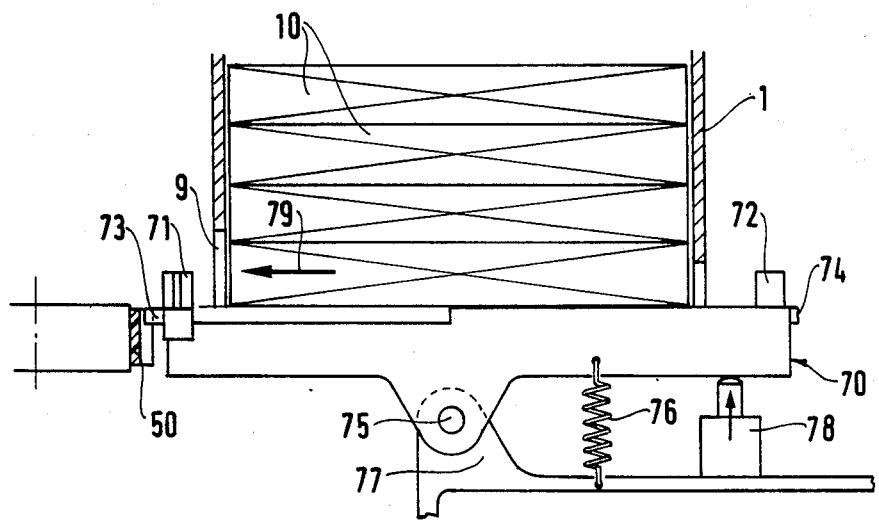
FIG. 8 is a diagrammatic view similar to FIG. 7 showing the cartridge in its working position.

FIGS. 7 and 8 show a variant embodiment of the ejector cartridge. The bin 1 per se is analogous to that shown in FIG. 1. The cartridge 70 contains a chain analogous to the chain 21 shown in FIG. 1 except that the links 71 and 72 carrying the ejector pegs have side meshing teeth 73 and 74 which are truncated downwardly. The cartridge assembly as a whole is capable of pivoting about an axis 75 parallel to the belt 50 between a rest position (FIG. 7) and a working position (FIG. 8). A spring 76 connects the cartridge 70 to a support 77, and a controllable electromagnet 78 is disposed to move it to the working position.

It can be seen that when the cartridge is in its rest position the tooth 73 cannot engage the cog belt 50. However, when in the FIG. 8 position such engagement becomes possible. The chain travels in the direction of arrow 79 and the peg on link 72 ejects an object 10 through the evacuation opening 9.

Figure 9:
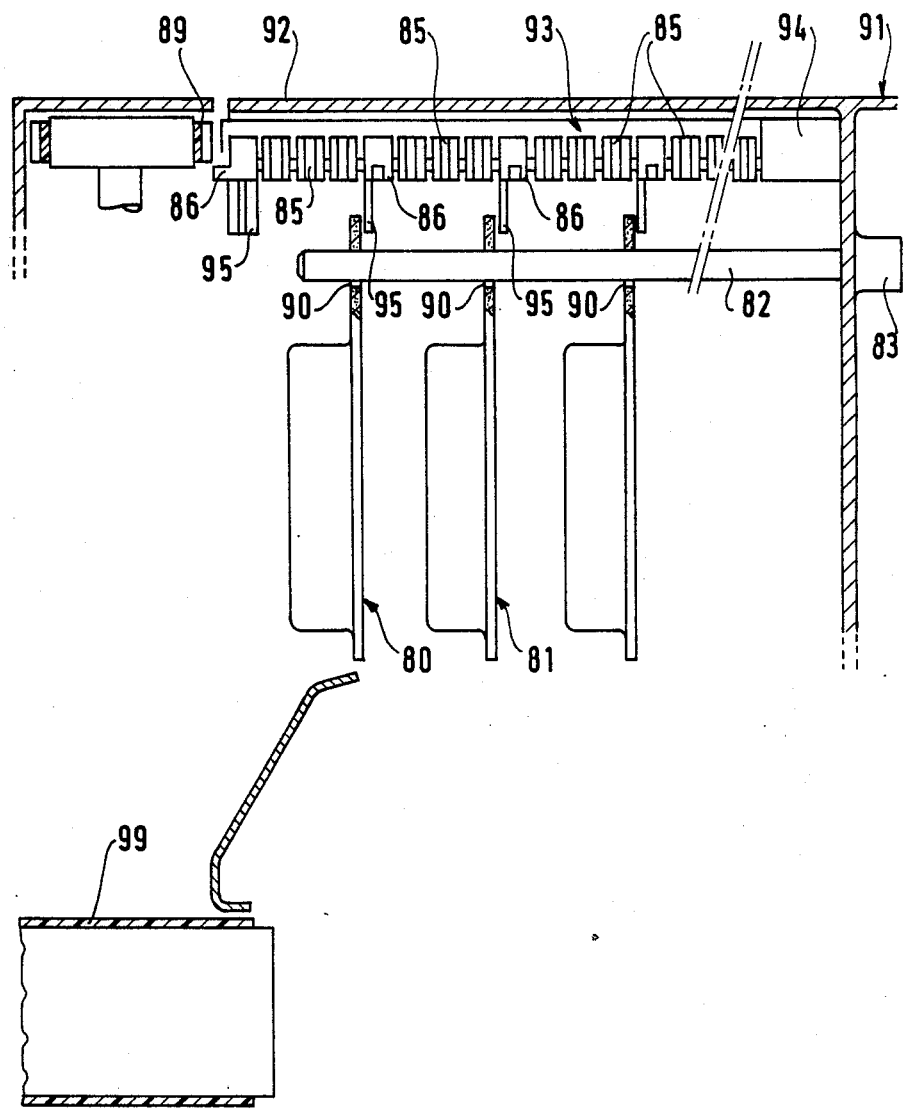
FIG. 9 shows a variant embodiment of a magazine in accordance with the invention for storing and dispensing blister packs.

The device shown very diagrammatically in FIG. 9 is used for storing and dispensing blister packs or the like, e.g. flexible bags suspended from clips which are threaded like blister packs 80, 81 having orifices 90 for going round a guide bar 82 fixed to the rear wall 83 of a bin 91. The ceiling 92 of the bin 91 has an ejector cartridge 93 provided with a control device 94 analogous to that shown in FIG. 1. This is an electromagnet having an arm capable of advancing a chain through one notch, said chain comprising links 85 analogous to the links 22 of FIG. 1, together with a plurality of links 86 each carrying an ejector peg 95 and not having a side drive tooth. Each blister is associated with one of the links 86 together with a plurality of links 85 interposed between two successive links 86. The cartridge 93 cooperates with the cog belt 89 analogous to those described above.

It can be seen that when the electromagnet 94 is actuated, the chain advances by one notch, thereby enabling the links 85 to be driven by the belt 89 and consequently enabling the link 86 associated with blister pack 80 to push said pack by means of its ejector peg 95 until the pack is disengaged from the bar 82. Motion ceases as soon as the next link 86 having no side tooth comes level with the belt 89. The blister pack is evacuated by the conveyor 99.

Naturally, the invention is not limited to the embodiments described above. Without going beyond the scope of the invention any of the means described could be replaced by equivalent means.

For example, devices in accordance with the invention may be used for dispensing goods directly to customers or for making up orders in large wholesale establishments.

We claim:

1. A magazine for storing and automatically dispensing packaged objects, the magazine comprising a plurality of juxtaposed bins constituting a linear structure which is generally rectangular in shape, each bin having a horizontal surface and being intended to store a plurality of objects, each bin having an evacuation opening in a front face suitable for passing out a single packaged object, each bin including an ejector cartridge in said horizontal surface thereof, said cartridge serving to eject one packaged object at a time from the bin, said cartridge comprising firstly a chain of links situated substantially in a horizontal plane, at least one of said links including at least one means suitable for ejecting said object through said evacuation opening when said chain is set in motion, and secondly ejection control means for meshing said chain with a cog belt situated parallel to the front face of said linear structure level with the ejector cartridges and operatively coupled with means for constantly driving said cog belt in translation, and wherein said cog belt solely provides the movement of the chain once engagement of the linked chain with said cog belt is effected by said ejection control means, and a conveyor positioned parallel to said structure for removing said ejected object.

2. A magazine according to claim 1, wherein each bin is suitable for containing a vertical stack of boxes and has two side faces, said bin front face opening for passing out the object is situated at the bottom of the stack, said bin further comprising, a rear face, said horizontal surface is a bottom surface with a slot running between the bin front face and rear face, said bin being provided beneath its bottom surface with said ejector cartridge including a closed guide, said chain links sliding around said closed guide and having two rectilinear portions, one of which is lower than the other, said rectilinear portions being interconnected by two semicircular portions forming a closed loop therewith, each link having a meshing tooth on its outer side face except for two diametrically opposite links, which are provided with respective ejector pegs positioned for passing along said slot and constituting said ejection means, and said ejection control means being provided near said rear face for causing a peg-carrying link to advance by one notch.

3. A magazine according to claim 1, wherein said objects are boxes, each bin is suitable for containing a vertical stack of said boxes and has two side faces, said bin front face opening for passing out the box is situated at the bottom of the stack, said bin further including a rear face, and said horizontal surface being a bottom surface with a slot running between the bin front face and rear face, said bin being provided beneath said bottom surface with said ejector cartridge, said ejector cartridge chain of links being rotatable about a shaft parallel to said cog belt between a chain rest position and a chain working position, said ejection control means comprising an electromagnet for controlling said positions, said chain contained in said cartridge including two links having side meshing teeth truncated so as to avoid engaging said cog belt when said cartridge is in its rest position, but having adjacent links which engage with said constantly driven cog belt when the chain is in its working position.

4. A magazine according to claim 1, wherein said bin horizontal surface is a ceiling, each bin has a rear face intended to contain a row of packages hanging from a rod fixed to the rear face of the bin, with each bin ejector cartridge being contained in said ceiling, said cartridge chain of links having respective side meshing teeth, and a plurality of toothless links, with one toothless link per package, said toothless links carrying respective ejector pegs, and said ejection control means being provided in the vicinity of said bin rear face to advance a peg-carrying link by one notch.

5. A magazine according to claim 1, wherein said conveyor includes drive means for driving said conveyor; said drive means including means for coupling drive means of a conveyor of an analogous magazine juxtaposed thereto.

6. A magazine according to claim 1, wherein said cog belt is made of a flexible substance which is sufficiently flexible that each of its teeth is elastically crushed by a meshing tooth of one of the links.

7. A magazine according to claim 1, wherein said links engage one another by a ball-and-socket type connection.

* * * * *